(12) United States Patent
Ito et al.

(10) Patent No.: US 12,072,324 B2
(45) Date of Patent: Aug. 27, 2024

(54) CHROMATOGRAPH AND APPARATUS FOR DETERMINING CHROMATOGRAPH ANALYSIS METHOD

(71) Applicant: HITACHI HIGH-TECH SCIENCE CORPORATION, Tokyo (JP)

(72) Inventors: Masahito Ito, Tokyo (JP); Yusuke Hosen, Tokyo (JP); Shinichi Ozawa, Kanagawa (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 1266 days.

(21) Appl. No.: 16/565,182

(22) Filed: Sep. 9, 2019

(65) Prior Publication Data
US 2020/0103381 A1 Apr. 2, 2020

(30) Foreign Application Priority Data

Sep. 28, 2018 (JP) ................................ 2018-185302

(51) Int. Cl.
*G01N 30/86* (2006.01)
*G01N 30/88* (2006.01)
*G01N 30/02* (2006.01)

(52) U.S. Cl.
CPC ..... *G01N 30/8651* (2013.01); *G01N 30/8658* (2013.01); *G01N 2030/027* (2013.01); *G01N 2030/8809* (2013.01)

(58) Field of Classification Search
CPC ......... G01N 30/8651; G01N 2030/027; G01N 2030/8809; G01N 30/8658
See application file for complete search history.

(56) References Cited

U.S. PATENT DOCUMENTS 5,039,409 A * 8/1991 Blaffert ................... G01N 30/88
210/198.2
10,890,566 B2 * 1/2021 Katsuyama ........ G01N 30/8658
(Continued)

FOREIGN PATENT DOCUMENTS

JP 03063566 A 3/1991
JP 4-90002 A 3/1992
(Continued)

OTHER PUBLICATIONS

Sheliya et al, Ultra Performance Liquid Chromatography (UPLC): A Modern Chromatography Technique, Pharma Science Monitor an International Journal of Pharmaceutical Sciences, vol. 4, Issue- 3, Apr.-Jul. 2013, pp. 78-99 (Year: 2013).*
(Continued)

*Primary Examiner* — John C Kuan
(74) *Attorney, Agent, or Firm* — Holland & Hart LLP

(57) ABSTRACT

To enable appropriate analysis to easily be performed in accordance with an object to be analyzed, provided is an apparatus for determining a chromatograph analysis method includes: an input portion (220) configured to receive input of a sample name of a sample to be analyzed and a component name; a storage (230) configured to store an analysis method for a component corresponding to the component name in the sample corresponding to the sample name so that the analysis method is associated with the sample name and the component name; and a controller (210) configured to search the storage for the analysis method, which corresponds to the sample name and the component name input to the input portion, to read the analysis method from the storage, and present the analysis method to a user.

8 Claims, 8 Drawing Sheets

(56) References Cited

U.S. PATENT DOCUMENTS

| | | | |
|---|---|---|---|
| 2013/0303409 A1* | 11/2013 | Kapps | G01N 30/24 |
| | | | 506/39 |
| 2017/0115261 A1* | 4/2017 | Matsuo | G01N 35/0092 |
| 2017/0234839 A1* | 8/2017 | Terada | G01N 30/46 |
| | | | 73/61.55 |
| 2019/0353627 A1* | 11/2019 | Kurotobi | G01N 30/8631 |
| 2022/0003722 A1* | 1/2022 | Watanabe | G01N 30/32 |

FOREIGN PATENT DOCUMENTS

| | | | |
|---|---|---|---|
| JP | 2003099439 | * | 4/2004 |
| JP | 2014-142258 A | | 8/2014 |

OTHER PUBLICATIONS

ACD Labs, "ACD/Public Chromatography Applications Database" acdlab.com 2016 (Year: 2016).*

Wang et al., "Efficient HPLC method development using structure-based database search, physico-chemical prediction and chromatographic simulation" Journal of Pharmaceutical and Biomedical Analysis 104 (2015) 49-54 (Year: 2016).*

* cited by examiner

240

ANALYSIS NAVIGATION

SEARCH WORD
☐ SAMPLE NAME    ☐ COMPONENT NAME

ANALYSIS OF SEARCH DATA
☐ AUTOMATIC

OPTIMIZATION BASED ON EXTRACTED CHARACTERISTICS
☐ AUTOMATIC

SETTING OF APPARATUS PARAMETERS BASED ON OPTIMIZED ANALYSIS METHOD
☐ AUTOMATIC

FIG. 6

CHROMATOGRAPH AND APPARATUS FOR DETERMINING CHROMATOGRAPH ANALYSIS METHOD

This application claims the benefit of Japanese Patent Application No. 2018-185302 filed Sep. 28, 2018, which is hereby incorporated by reference in its entirety into this application.

BACKGROUND OF THE INVENTION

1. Field of the Invention

The present invention relates to a chromatograph for analyzing a component contained in a sample, and to an apparatus for determining a chromatograph analysis method.

2. Description of the Related Art

There has hitherto been proposed a chromatograph control system capable of determining each optimum control parameter by comprehensively evaluating control parameters and a response result such as a chromatogram (see, for example, Japanese Patent Application Laid-open No. Hei 4-90002). In this system, experience and intuition of a skilled operator are quantified to determine an operation amount of an actuator, and thus a chromatograph control system rich in scalability, which adopts know-how of the skilled operator, is obtained.

SUMMARY OF THE INVENTION

However, even through use of an inference based on the know-how of the skilled operator, it is not always easy to appropriately analyze a wide variety of objects to be analyzed.

The present invention has been made in view of the foregoing, and an object of the present invention is to enable appropriate analysis to easily be performed in accordance with an object to be analyzed.

In order to achieve the above-mentioned object, according to at least one embodiment of the present invention, there is provided an apparatus for determining a chromatograph analysis method, which is configured to determine an analysis method for separating a component contained in a sample to detect the component through a chromatograph, the apparatus including: an input portion configured to receive input of a sample name of a sample to be analyzed and a component name; a storage configured to store an analysis method for a component corresponding to the component name in the sample corresponding to the sample name so that the analysis method is associated with the sample name and the component name; and a controller configured to search the storage for the analysis method, which corresponds to the sample name and the component name input to the input portion, to read the analysis method from the storage, and present the analysis method to a user.

With this, the analysis method is searched for based on the sample name and the component name. Thus, for example, even in analysis of the same sample, analysis suitable for a component of interest can easily be performed, and even in detection of the same component, appropriate analysis can easily be performed in accordance with the balance with other components contained in a sample depending on the sample.

Further, the analysis method stored in the storage further includes a chromatogram of a standard analysis result, and the controller is further configured to determine an analysis condition based on the chromatogram stored in the storage.

With this, for example, the sample name and the component name are designated, and a chromatogram searched for in accordance with the designated sample name and component name is analyzed. Thus, an appropriate analysis condition and the like are automatically set, and, for example, setting by a user can easily be performed.

According to the present invention, the appropriate analysis can easily be performed in accordance with an object to be analyzed.

BRIEF DESCRIPTION OF THE DRAWINGS

FIG. 6 is an explanatory view for illustrating a display example on a display portion.

DESCRIPTION OF THE EMBODIMENTS

Now, an example of a liquid chromatograph that is an amino acid analyzer according to at least one embodiment of the present invention is described in detail with reference to the drawings.

Configuration of Liquid Chromatograph 100

Figure 1:
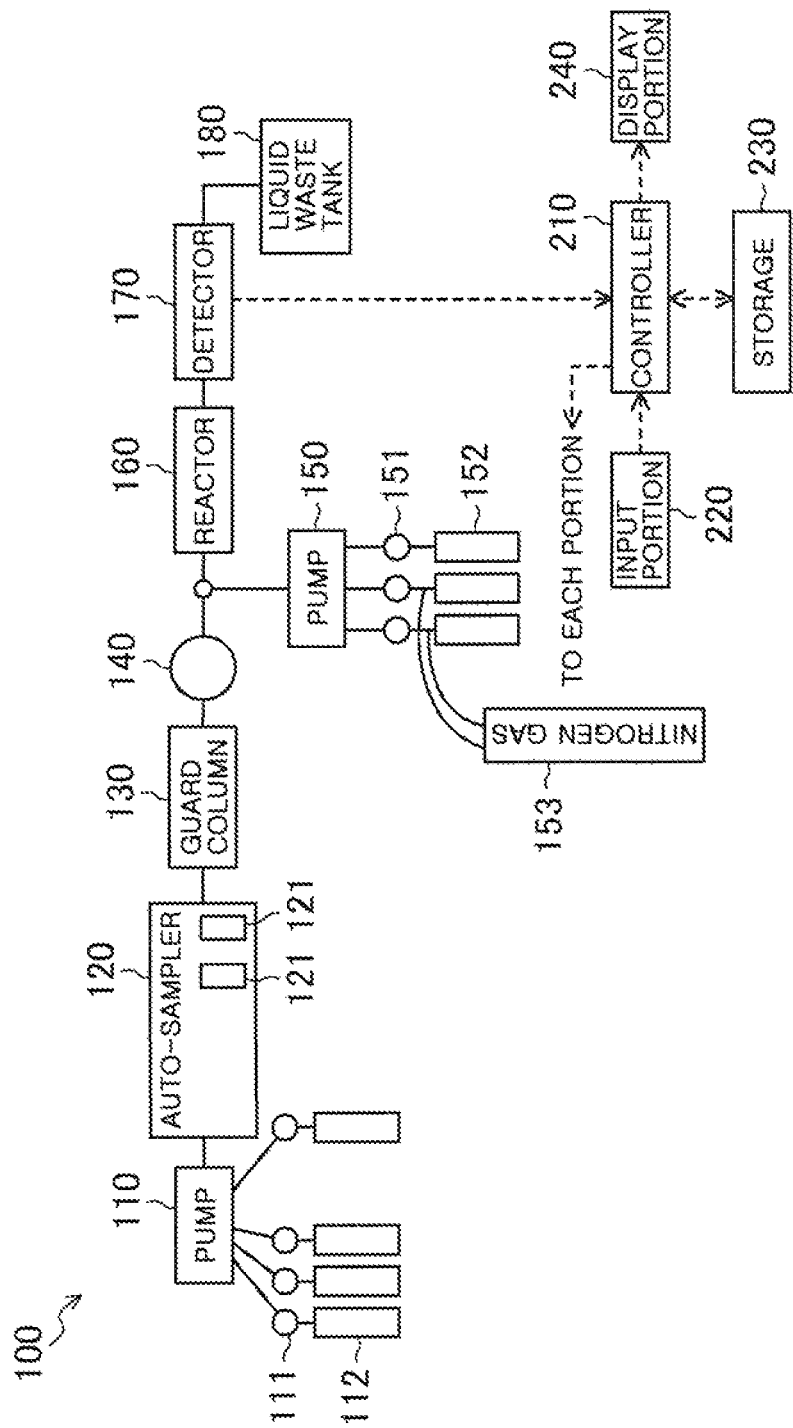
FIG. 1 is a block diagram for illustrating a schematic configuration of a chromatograph.
Figure 2:
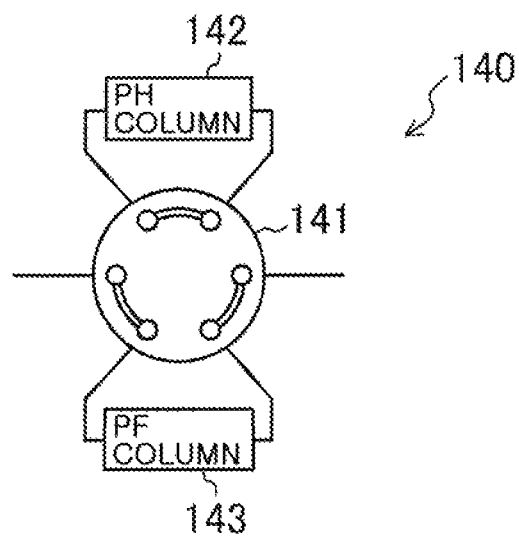
FIG. 2 is a block diagram for illustrating a configuration of a column selecting valve.

A schematic configuration of a liquid chromatograph 100 is illustrated in FIG. 1. The liquid chromatograph 100 includes a pump 110, an auto-sampler 120, a guard column 130, a column selecting valve 140, a pump 150, a reactor 160, a detector 170, and a liquid waste tank 180. The pump 110 is configured to feed an eluent 112 supplied through a valve 111. The auto-sampler 120 is configured to inject a sample (not shown). The pump 150 is configured to supply a reaction liquid 152 through a valve 151. The detector 170 is configured to detect a separated component in a sample. In addition, a nitrogen gas 153 can be introduced in order to perform deaeration (bubbling) in the reactor 160, and oxidation can be prevented by sealing a bottle with the nitrogen gas 153. For example, a reference sample 121 for protein hydrolyzation (PH) and a reference sample 121 for analysis of a physiological fluid (PF) are accommodated in the auto-sampler 120 so as to be selectively used. In addition, as illustrated in FIG. 2, in the column selecting valve 140, a PH column 142 or a PF column 143 is selectively used through use of a six-way valve 141.

Figure 3:
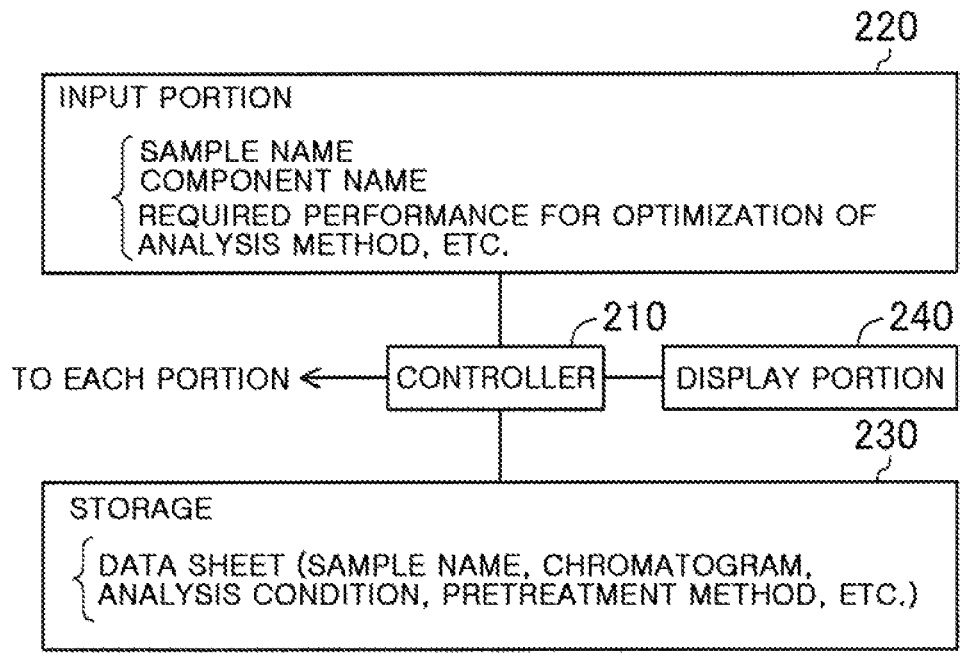
FIG. 3 is an explanatory diagram for illustrating a functional configuration regarding determination of an analysis method.

In addition, as illustrated in FIG. 3, the liquid chromatograph 100 includes a controller 210, an input portion 220, a storage 230, and a display portion 240. The controller 210 is configured to control the operation of each constituent element of the liquid chromatograph 100. The input portion 220 is configured to allow a user to input an operation instruction. The storage 230 is configured to store various pieces of data and the like. The display portion 240 is configured to display an analysis result and the like.

Figure 4:
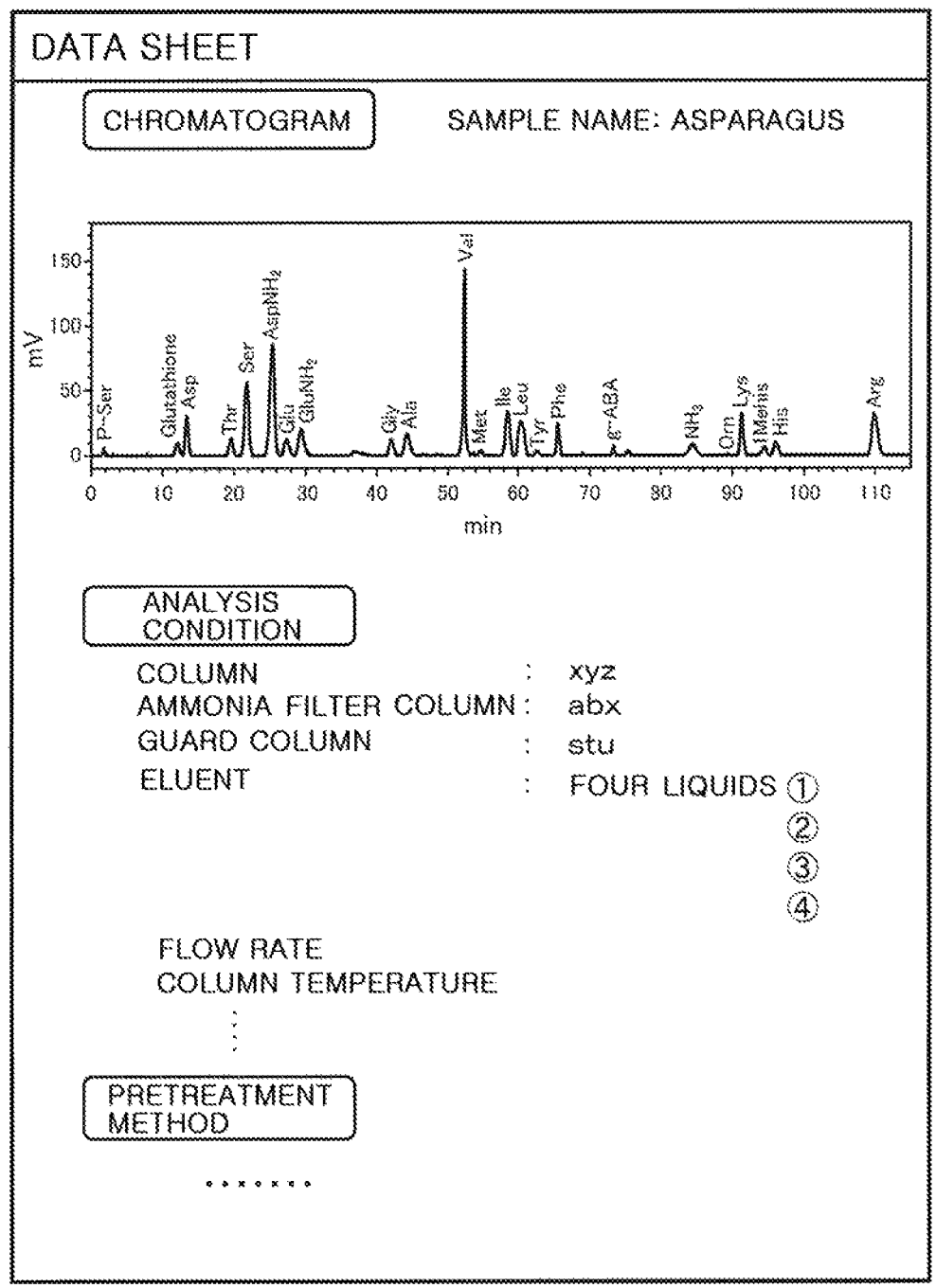
FIG. 4 is an explanatory view for illustrating an example of a data sheet stored in a storage.

The controller 210, the input portion 220, the storage 230, and the display portion 240 are also configured to function as an apparatus for determining a chromatograph analysis method, which is configured to determine an analysis method of analysis performed in the liquid chromatograph 100. Specifically, for example, the input portion 220 is configured to receive input of a sample name of a sample to be analyzed, a component name, and the like. For example, as illustrated in FIG. 4, the storage 230 is configured to store a data sheet (DS) including a chromatogram obtained regarding the sample corresponding to the sample name, an analysis condition, a pretreatment method, and the like so that the chromatogram, the analysis condition, the pretreatment method, and the like are associated with the sample name. The controller 210 is configured to search the storage 230 for the analysis method, which corresponds to the sample name and the component name input to the input portion 220, to read the analysis method from the storage 230, and present the analysis method to the user through the display portion 240 or the like. In addition, the analysis method for a component to be analyzed can be optimized by analyzing the chromatogram. The apparatus for determining a chromatograph analysis method may be provided separately from a main body of the liquid chromatograph 100.

(Overview of Operation of Determining Analysis Method and Analysis Operation)

In the liquid chromatograph 100, an operation of determining an analysis method and an analysis operation are performed, for example, as follows.

When "asparagus" and "glutamic acid" are input to the input portion 220 as names of a sample and a component to be analyzed, the data sheet stored in the storage 230 is searched for through use of those terms as keywords, a corresponding analysis method and an analysis result example are read from the data sheet to be displayed on the display portion 240. The user performs, with reference to the display on the display portion 240, setting of pretreatment and an analysis time program (gradient elution time program), selection of the eluent 112, the reference sample 121, the PH column 142 or the PF column 143, and the reaction liquid 152, and the like, thereby being capable of easily performing appropriate analysis. In addition, as required, the selection of the eluent 112 and the like may be automatically performed by the controller 210. In this case, the analysis method to be searched for is not limited to one. For example, a plurality of candidates may be searched for in accordance with required performances (analysis speed, separation degree, detection limit, reproducibility, and the like) separately input to the input portion 220 by the user, that is, in accordance with whether or not high-speed analysis, high-separation analysis, high-sensitivity analysis, and high-accuracy analysis are performed, and the plurality of candidates may also be searched for and sorted in order of priority as required to be displayed.

As described above, the analysis method is searched for based on the sample name and the component name. Thus, for example, even in analysis of the same sample, analysis suitable for a component of interest can be easily performed, and even in detection of the same component, appropriate analysis can be easily performed in accordance with the balance with other components contained in a sample depending on the sample.

(Determination Example of Analysis Method Based on Chromatogram Included in Searched Data Sheet)

For example, assuming that "asparagus" and "Glu" are input as a sample word and a component word, respectively, and a data sheet including a chromatogram of a standard analysis result as illustrated in FIG. 4 is obtained, an analysis method can also be optimized further based on the data sheet. Specifically, for example, when the chromatogram is read and interpreted, it can be detected that asparagine (AspNH2) and glutamine (GluNH2) are eluted to the periphery of glutamic acid (Glu). Then, when each peak height of those three components are measured from an actual chromatogram of asparagus, it is understood that the peak heights of AspNH2 and GluNH2 before and after Glu are three to five times higher than that of Glu. For example, in the case of quantitative analysis through use of general chromatography, when peak heights between peaks are significantly different, a certain separation degree of, for example, 1.5 or more, is generally required. Therefore, in order to ensure the separation degree of 1.5 or more, specifically, for example, the following is performed. Calculation for selecting a column longer than that under the condition included in the original data sheet to reduce a flow rate and take a certain analysis time is performed, and the optimized separation condition is presented to the user. In addition, apparatus parameters may be automatically set in accordance with the optimized separation condition.

Here, the actual chromatogram refers to a chromatogram described in the data sheet, which is obtained by measuring an actual sample.

When the user performs an instruction operation of indicating that the detection limit is set to 5 pmol or less to increase sensitivity, or when the user performs an operation of indicating that the repeating reproduction accuracy of quantitative analysis is set to 0.5% or less to increase accuracy, the analysis condition can also be optimized in accordance with the above-mentioned operations. In addition, the user is also enabled to perform optimization calculation of an analysis performance, such as an increase in speed, in a dialogue form.

(More Specific Operation Sequence Example of Liquid Chromatograph 100)

Figure 5A:
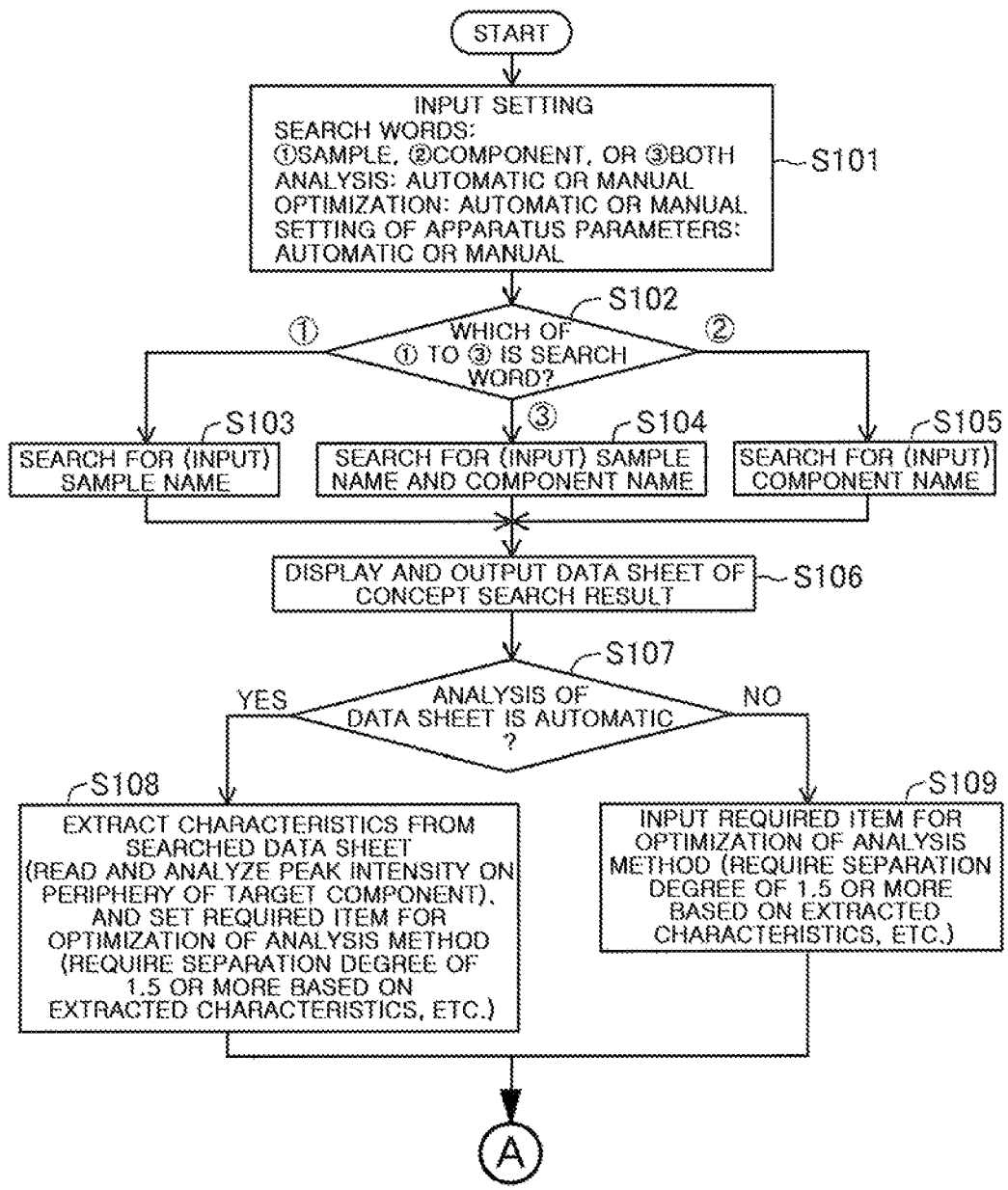
FIG. 5A and FIG. 5B are flowcharts for illustrating an operation of the chromatograph.
Figure 5B:
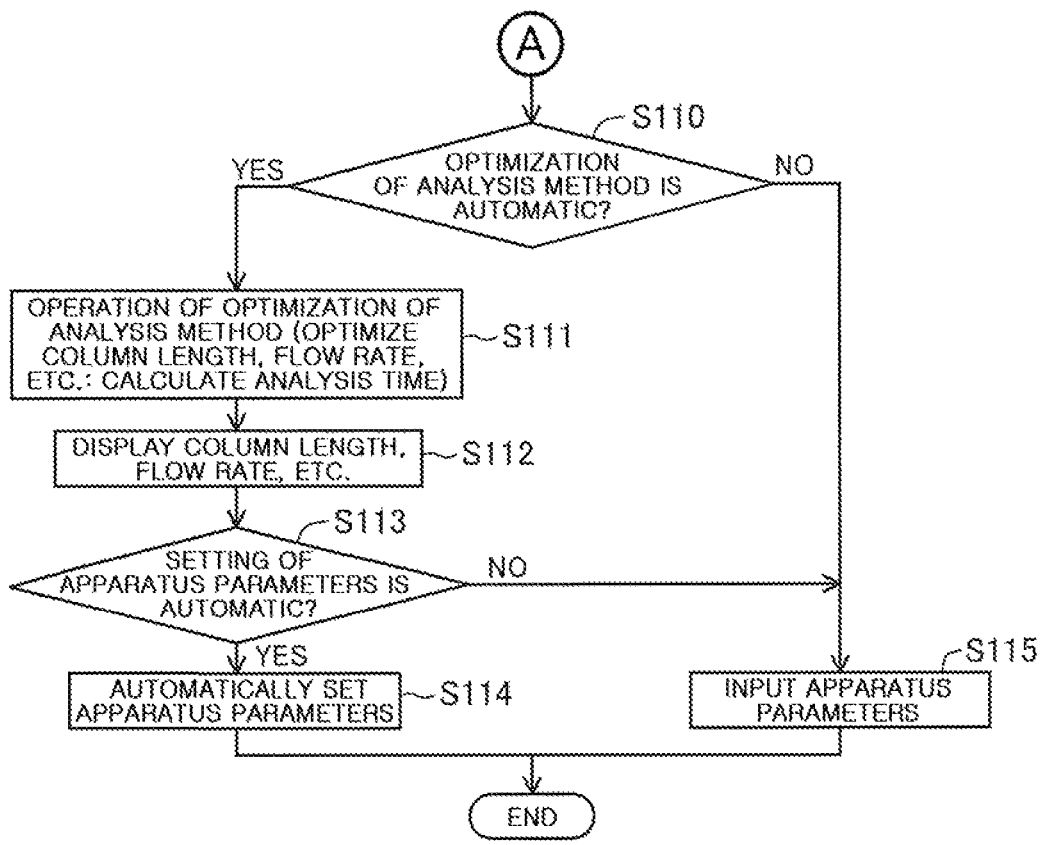

A more specific operation sequence example of the liquid chromatograph 100 is described with reference to FIG. 5A and FIG. 5B.

(Step S101)

First, for example, an input operation screen (input screen for setting analysis method navigation) including check boxes and the like as illustrated in FIG. 6 is displayed on the display portion 240, and an input operation is received from the input portion 220. With this, the following can be designated in advance: whether or not the user attempts to search for the data sheet by designating any one of a sample name and a component name or designating both of the sample name and the component name; whether or not the searched data sheet is automatically analyzed; whether or not an analysis method is automatically optimized based on extracted characteristics; and whether or not the apparatus parameters are automatically set based on the optimized analysis method.

(Step S102) to (Step S105)

Each input is received in accordance with the designation regarding the sample name and the component name, and the data sheet stored in the storage 230 is searched for.

(Step S106)

The contents of the searched data sheet, for example, as illustrated in FIG. 4 are displayed on the display portion 240.

(Step S107 to Step S109)

Next, the flow proceeds to a characteristics extraction step. When analysis regarding characteristics extraction is manually performed (for example, when the user is a skilled person), the user checks a chromatogram (FIG. 4) of the searched data sheet. For example, asparagine (AspNH2) and glutamine (GluNH2) are eluted to the periphery of glutamic acid (Glu) in the chromatogram. Therefore, the user visually recognizes peak heights of those three components from an actual chromatogram of asparagus. The user confirms that the peak heights of AspNH2 and GluNH2 before and after Glu are three to five times higher than that of Glu and determines that a separation degree of 1.5 or more is required. As required, a skilled person can input the separation degree of 1.5 or more as a required item.

Meanwhile, when analysis regarding characteristics extraction is automatically performed, an analysis engine reads the searched chromatogram and makes the same interpretation as the foregoing. Specifically, the analysis engine finds that the peak heights of the three components are three to five times higher than that of Glu. In the case of quantitative analysis through use of chromatography, when the peak heights between peaks are significantly different, and the storage 230 has the knowledge that a certain separation degree of, for example, 1.5 or more should be generally required, the analysis engine requires the separation degree of 1.5 or more as a required item with respect to an optimization step in accordance with the knowledge.

(Step S110 to Step S112)

When automation of optimization is checked, optimization calculation is performed. Specifically, for example, a column length under an analysis condition of the searched data sheet is read to be 60 mm, and in order to increase and improve a separation degree, calculation for actually extending the column length to an existing column of 80 mm is performed. When the separation degree of 1.5 or more is obtained from this calculation result, the proposal to increase the column length to 80 mm is displayed. A flow rate, a gradient elution time program, and the like in this case can also be automatically optimized, and an analysis time can also be simultaneously calculated.

(Step S113 to Step S114)

In a setting step of apparatus parameters, when automation is checked, the column length of 80 mm is presented to the user as required and automatically set in the apparatus together with the flow rate, the gradient elution time program, and the like.

(Step S115)

In addition, when it is determined in Step S110 that the "analysis method is manually optimized, and when it is determined in Step S113 that the apparatus parameters are manually set, setting of the parameters in the apparatus by the user is received.

As described above, the sample name and the component name are designated, and a chromatogram searched for in accordance with the designated sample name and component name is analyzed. Thus, an appropriate analysis condition and the like are automatically set, and setting by a user and the like can be easily performed.

Modification Example

In the above-mentioned search for the analysis method, an ambiguous search may be performed so that notation variability, synonyms, and the like are to be automatically searched for, and an associative search may be performed so that related terms are to be searched for. In addition, for example, when there is an analysis example of a tomato in a database, an input value "vegetable" as a generic concept thereof may be set to be hit.

In addition, input of a search keyword and the like may be performed through selective operation from a predetermined pull-down menu.

In addition, a data sheet ID is set to a data sheet including chromatogram measurement data with a sample name and a component name being handled as a set, which is stored in the storage 230, and a barcode is associated with the data sheet. With this, operation setting of the analysis method in the liquid chromatograph 100 and the like may be performed.

In addition, search results may be sorted in order of hit ratios of search conditions and displayed on the display portion 240.

In addition, the pretreatment method and the like in the search results may be presented to the user through use of a flowchart, a video, or the like.

In addition, when the pretreatment method is not performed by the user as presented, notification of the fear in that an expected result is not obtained may be displayed so as to warn the user.

In addition, the search is not limited to a search for the analysis method stored in the storage 230. For example, an analysis method stored in a server that is accessible via the network may be set to be searched for.

As described above, the analysis method is searched for based on the sample name and the component name. Thus, for example, even in analysis of the same sample, analysis suitable for a component of interest can be easily performed, and even in detection of the same component, appropriate analysis can be easily performed in accordance with the balance with other components contained in a sample depending on the sample.

In addition, for example, the chromatogram included in data (data sheet) of the searched analysis method can be once analyzed and interpreted through use of an analysis engine for the searched analysis method and an optimization engine for the analysis method, and then the analysis method can be optimized. When a high-separation performance or a high-sensitivity performance is required by the analysis engine, the searched analysis method is optimized through use of the optimization engine based on the performance requirement. With this, the analysis method that has been merely searched can be further enhanced in performance.

(Other Items)

In the above-mentioned example, description is given of the case in which an analysis method, including a chromatogram, an analysis time program, and the like, is stored in the storage 230. However, the present invention is not limited thereto, and the analysis method stored in the storage 230 may include at least one of a pretreatment method, a separation method, a reaction method, and a detection method used at a time of analysis.

In this case, the separation method encompasses, as the analysis time program, a gradient elution time program, a switching timing of a column temperature, a switching timing of a stepwise elution method, and the like. The stepwise elution means a stepwise switching method of an eluent, and is an elution method involving maintaining liquid feeding in a single solvent for a certain period of time, and then switching the solvent to a single solvent of another kind at a specific time. A gradient elution method refers to a linear gradient elution method in a narrow sense, and an elution method involves changing of a mixing ratio of an eluent 1 and an eluent 2 at a certain gradient through control of an electromagnetic valve or the like with the passage of time. Meanwhile, the column temperature can be switched to a control target temperature of, for example, from 40° C. to 70° C. at a specific time through a time program. Actually, the temperature is switched, and then the target temperature is attained with slight time delay (for example, Japanese Patent Application Laid-open No. 2014-119402).

Basically, a separation column, eluents, a solute of an analyte belong to the separation method, and in association therewith, a mixing ratio of the eluents, compositions of the eluents, a flow rate, a column temperature, a column length, the kind of a column filler, a particle diameter of the column filler, an injection amount, a sample concentration, and the like also belong to the separation method. Sizes of an ammonia filter column, a pre-column, a guard column, and the like, and the kind of the filler also belong to the separation method.

In the reaction method, a reaction temperature such as 130° C. or 135° C. is an input set value. In addition, a cartridge type reactor, a reaction column, a reaction coil, or the like can be selected as a reactor. First, as a post-column derivatization method, there are given a ninhydrin method and an ortho-phthalaldehyde (OPA) method, and the latter is excellent in sensitivity. Meanwhile, six kinds of a pre-column derivatization method are listed in The Japanese Pharmacopoeia, Seventeenth Edition (for example, Fujifilm Wako Pure Chemical Corporation, Report Vol. 86, No. 3, 15-17, Author; Masato Itoh).

When the detection method is the ninhydrin method, the detection wavelength is fixed to 570 nm and 440 nm. Examples of variable parameters include a time constant of a detection circuit and a sampling period of data collection. In addition, also in various kinds of methods such as the post-column derivatization method, the OPA method, and the pre-column derivatization method, a detection wavelength, a time constant, a sampling period, and the like are set variables.

The amino acid analysis is described above as an example, but the present invention is extendable to a general analysis method of high-performance liquid chromatography (HPLC). Thus, the detection method is also extendable to UV detection, UV-VIS detection, DAD, fluorescent detection, RI detection, MS detection, and the like.

In the foregoing, description is given of the example in which a search and the like are performed in accordance with input of at least one designated condition selected from high-speed analysis, high-separation analysis, high-sensitivity analysis, and high-accuracy analysis. More specifically, the following is conceivable.

In liquid chromatography, an increase in speed and an increase in separation degree are contradicting performances. Therefore, a searcher of an analysis method unconsciously intends to adopt any one of the performances in many cases. The reason for this is as follows. When the searcher is asked which of the performances is prioritized, any one of the answers "a high speed is prioritized although a separation degree may not be so high" and "a high separation degree is prioritized although it may take some time" is given. The search system may be configured to input whether or not a speed is further increased or a separation degree is further increased to the chromatogram of the data sheet obtained as the search result. As a user interface, a form of asking the searcher a question may be adopted.

In general, when the separation degree is increased, a column is extended, for example, by 1.5 times so as to increase the number of theoretical stages. It takes time for an analyte to be eluted from the column correspondingly.

Further, a pressure loss of the column is also increased. Therefore, it may be inevitable to decrease a flow rate in some cases, with the result that a longer retention time is taken. In contrast, when the speed is increased, a column is shortened by from 20% to 30%. In this case, the number of theoretical stages is decreased correspondingly, but an analyte is quickly eluted. A pressure loss is also decreased, and hence a flow rate is increased, with the result that a speed is further increased. Those series of mechanisms can also be formulated. However, when typical separation conditions are stored as options in advance, the separation condition of an increase in speed can be presented in accordance with the intention of the searcher. The separation condition of an increase in separation degree can also be presented similarly with respect to the chromatogram as the search result.

Figure 7:
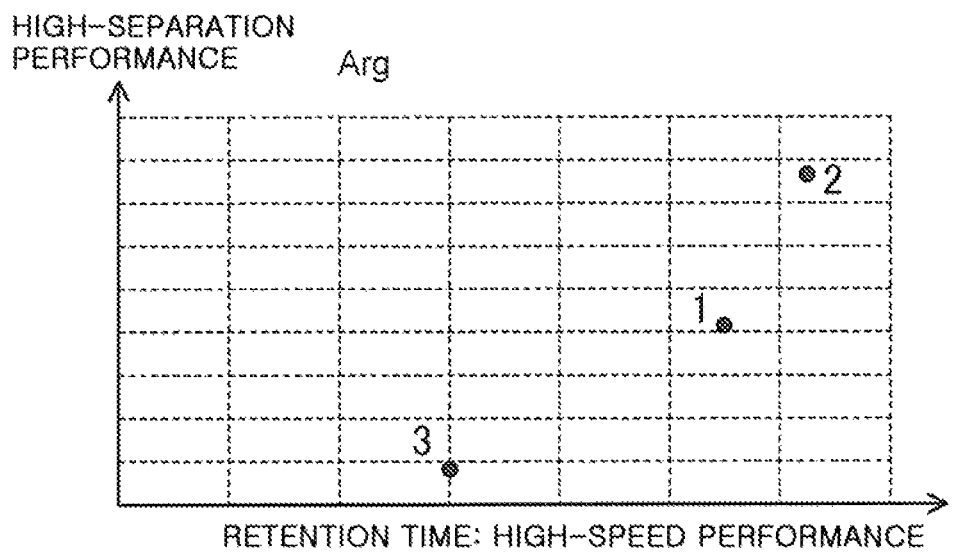
FIG. 7 is a graph for showing a correlation between a high-speed performance and a high-separation performance.
Figure 8:
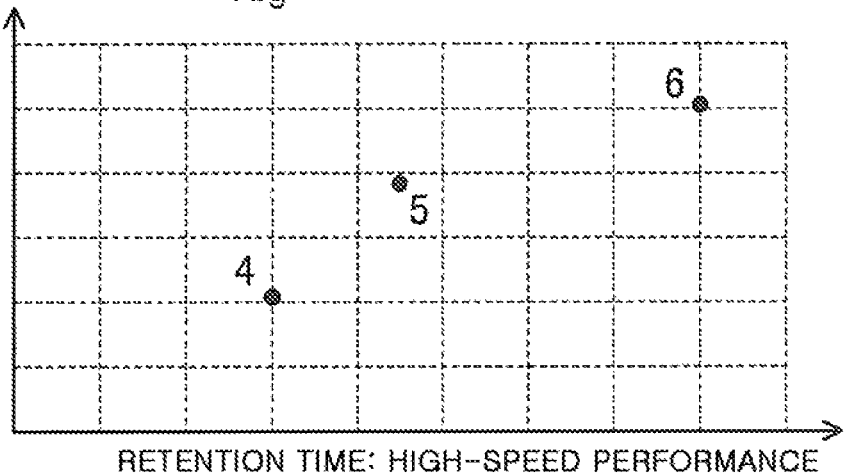
FIG. 8 is a graph for showing another correlation between a high-speed performance and a high-separation performance.

In this case, the high-speed performance and the high-separation performance have a correlation as shown in FIG. 7 and FIG. 8.

For example, in a case of a PF method of FIG. 7, the vertical axis represents a high-separation performance, and the horizontal axis represents a high-speed performance. The high-separation performance is the square of the number of theoretical stages, and the high-speed performance shown in FIG. 7 is a retention time of arginine (Arg). Thus, the high-separation performance and the high-speed performance substantially have a correlation.

A column in an analysis method No. 1 to be a reference has a length of 60 mm, a filler type of A, and a flow rate of 0.35 ml/min. The characteristics of the high-speed (retention time) and high-separation performances are considered to be equivalently distributed (50%:50%).

When the analysis method is increased in speed, the analysis method is changed to, for example, an analysis method No. 3 in which a column has a length of 25 mm+25 mm, a filler type of B, and a flow rate of 0.5 ml/min. In this case, the high-speed performance is improved by about twice, but the high-separation performance is decreased by about ½ times. A distribution ratio between the high-speed performance and the high-separation performance is about 7:3 (67%:33%).

Meanwhile, when the separation degree is increased, an analysis method No. 2 can be selected. In this case, a column has a length of 40 mm+40 mm, a filler type of A, and a flow rate of 0.35 ml/min. In this analysis method, a distribution ratio between the high-speed performance and the high-separation performance is about 3:7 (33%:67%).

When the distribution ratio of the high-speed performance is required to be increased (for example, by about 70%) with respect to the reference analysis method No. 1, the analysis method No. 3 can be selected to achieve optimization.

Similarly, when the distribution ratio of the high-separation performance is to be increased (for example, by about 70%), the analysis method No. 2 can be selected to perform optimization.

As described above, the contradicting high-speed and high-separation performances can achieve optimization of the formulated analysis method through designation of the distribution ratio between.

The similar optimization can be performed regarding the other required performances such as the detection limit and the reproducibility as well as the ratio between the high-speed performance and the high-separation performance. In addition, the similar optimization can be performed also in the PF method and the PH method. Specifically, also in a case of the PH method of FIG. 8, a column in an analysis method No. 5 to be a reference has a length of 40 mm+40 mm, a filter type of A, and a flow rate of 0.40 ml/min, and thus, the high-speed performance and the high-separation performance are considered to be equivalently distributed. In contrast, in an analysis method No. 4, the high-speed performance is focused on, and in an analysis method No. 6, the high-separation performance is focused on.

When the increase in sensitivity is required, it is conceivable to readjust the reaction method and the detection method. In principle, it is also possible to readjust the reaction method and the detection method, but this readjustment ends up basic study of the analysis method in many cases. For example, the sensitivity is increased by switching a post-column derivatization method through an absorbancy detector of visible light using ninhydrin to a post-column derivatization method through a fluorescent detector using ortho-phthalaldehyde (OPA). When various pre-column derivatization methods are set to options, the separation method may also be required to be readjusted in some cases. Actually, when the data sheet of the reaction method and the detection method is newly searched for, a better result may be obtained in some cases as compared to the case of performing optimization with respect to the chromatogram as the search result.

In order to increase sensitivity in a relatively simple manner, there is given a method involving increasing the injection amount, for example, from 20 µL to 50 µL. In ion exchange chromatography in this example, the effect in which a component that is not eluted sufficiently with the first eluent is concentrated in a column head is obtained, and a peak area or a peak height is increased. Therefore, an SN ratio is increased, and high sensitivity is obtained. The drawback of means for increasing a sample amount is wasteful use of a sample, and when an excessive sample amount is used, peak broadening is caused as an adverse effect. In general, as another procedure for increasing sensitivity, the detection wavelength can be shifted for a specific component or the reaction temperature can also be increased. The effect of means for changing the amount and concentration of a reaction reagent may not be highly expected because an excessive amount of the reaction reagent is generally supplied.

Finally, regarding the method of increasing the sensitivity, a certain effect can be expected by increasing the injection amount of a sample. The repeating reproducibility of the auto-sampler has a certain correlation with the injection amount. Therefore, as the injection amount is larger, the reproducibility is higher. As means for increasing the injection amount from 20 µL to 50 µL described above in the increase in sensitivity is effective for improving reproducibility as well as for increasing the sensitivity. In addition, as means for improving the accuracy, it is also effective to increase a separation degree. When the separation degree is low, and overlapped peaks are present, peak areas of the peaks interfere with each other, and an accurate peak area is difficult to obtain. As a result, an accurate quantitative value may not be obtained in some cases. When relative accuracy is not obtained, reproducibility is not obtained, either, for this reason in many cases. It is desired that a separation performance be higher. In the case of a non-separation peak such as an overlapped peak, a shoulder peak, and a tailing peak, a quantitative property is low. The increase in separation degree is effective for accuracy, but it takes time as described above. Further, the increase in sensitivity also plays a role for the increase in accuracy. When the SN ratio is increased, it becomes easier to find out a start point and an end point of a peak.

As described above, the respective performances are related to each other, and hence there is a risk in that some adverse effect may be caused depending on which performance is prioritized. Specifically, it is effective for the searcher to display its intention regarding which performance is prioritized and what is optimized.

The above-mentioned correlation can also be formulated. When, as a user interface, optimization is instructed, for example, under a condition of setting weighting of the priority order of the high-speed performance of 30% and the high-separation performance of remaining 70%, optimization calculation processing can also be performed correspondingly.

What is claimed is:

1. An apparatus at a chromatograph for determining a chromatograph analysis method, which is configured to determine an analysis method for separating a component contained in a sample to detect the component through the chromatograph, the apparatus comprising:
   an input portion configured to receive input of a sample name of the sample to be analyzed and a component name;
   a storage configured to store the analysis method for the component corresponding to the component name in the sample corresponding to the sample name; and
   a controller configured to search the storage for the analysis method, wherein the analysis method corresponds to the sample name and the component name inputted to the input portion, to read the analysis method from the storage, and present the analysis method to a user through a display portion of the chromatograph, wherein:
   the input portion is configured to receive input of at least one designated condition selected from high-speed analysis, high-separation analysis, high-sensitivity analysis, and high-accuracy analysis;
   the controller is configured to preferentially search for the analysis method matched with the at least one designated condition; and
   the chromatograph is configured to perform an analysis operation in accordance with the searched analysis method.

2. The apparatus for determining the chromatograph analysis method according to claim 1, wherein the analysis method stored in the storage includes at least one of a pretreatment method, a separation method, a reaction method, and a detection method used at a time of analysis.

3. The apparatus for determining the chromatograph analysis method according to claim 1, wherein the controller is configured to read the analysis method from the storage using the sample name and the component name which are inputted to the input portion, wherein the searching the storage includes hits for notation variability of the sample name or the component name or both, synonyms of the sample name or the component name or both, or any combination thereof.

4. The apparatus for determining the chromatograph analysis method according to claim 1, wherein the controller is configured to perform an associative search for related terms of the sample name and the component name input to the input portion, to thereby read the analysis method from the storage.

5. The apparatus for determining the chromatograph analysis method according to claim 1, wherein the apparatus for determining the chromatograph analysis method is configured to present, to the user, the analysis method in which a separation degree of the component corresponding to the component name input to the input portion is a predetermined degree or more based on a chromatogram.

6. The apparatus for determining the chromatograph analysis method according to claim 1, wherein the chromatograph comprises an amino acid analyzer.

7. The apparatus for determining the chromatograph analysis method according to claim 1, wherein the chromatograph analyzes the sample by supplying an eluent and the sample and separates the component contained in the sample to detect the component, wherein the chromatograph includes the apparatus for determining the chromatograph analysis method.

8. The apparatus according to claim 1, wherein the analysis operation in accordance with the searched analysis method includes at least one of selection of a separation column and selection of an eluent.

* * * * *